A. R. MORRISSEY.
SANDER FOR VEHICLES.
APPLICATION FILED MAY 25, 1915.
1,217,202.
Patented Feb. 27, 1917.
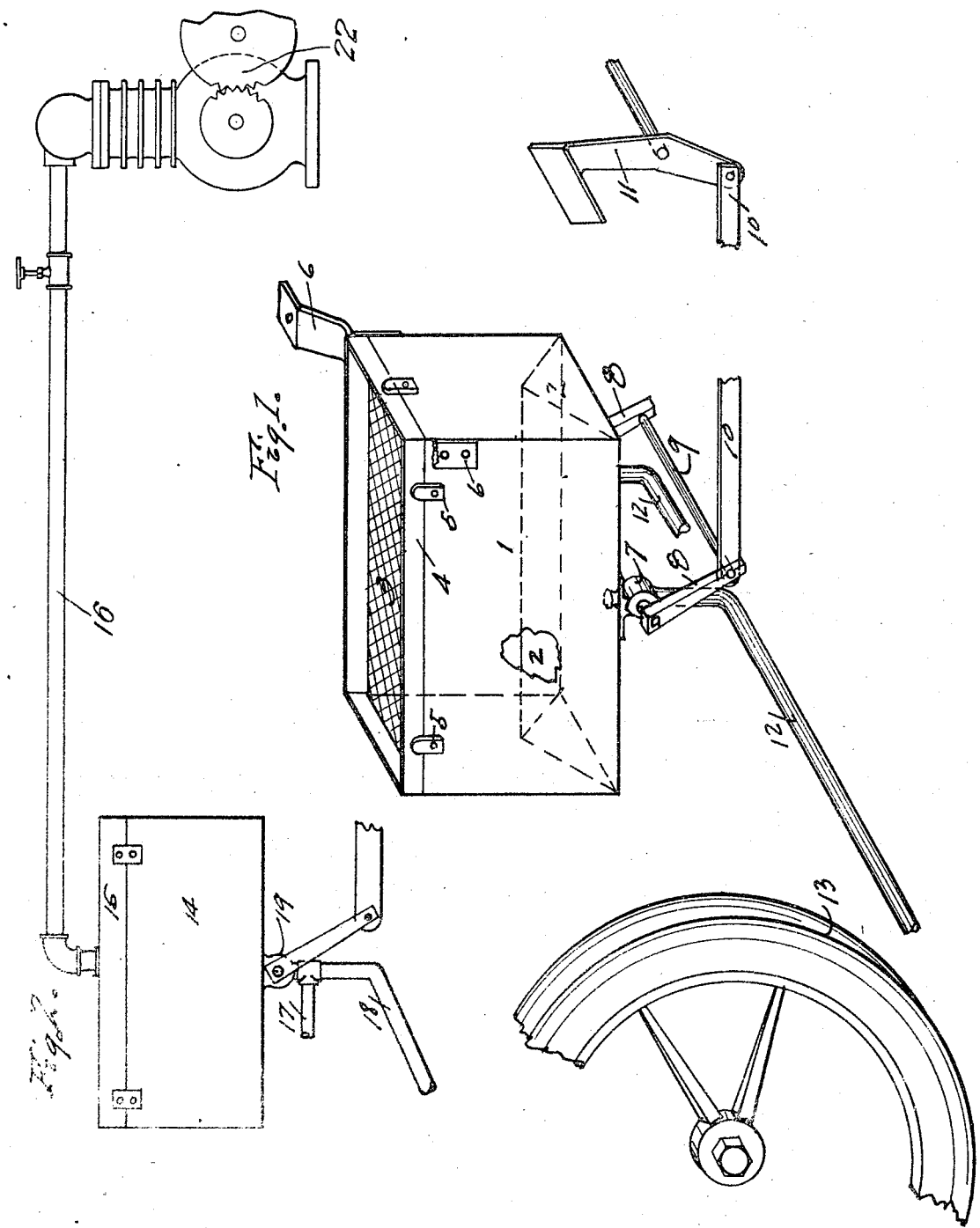

UNITED STATES PATENT OFFICE.

ARTHUR R. MORRISSEY, OF SEATTLE, WASHINGTON, ASSIGNOR OF ONE-THIRD TO EDWARD R. GERBER, OF KING COUNTY, WASHINGTON.

SANDER FOR VEHICLES.

1,217,202.  Specification of Letters Patent.  Patented Feb. 27, 1917.

Application filed May 25, 1915. Serial No. 30,288.

*To all whom it may concern:*

Be it known that I, ARTHUR R. MORRISSEY, a citizen of the United States, and a resident of Seattle, in the county of King and State of Washington, have invented certain new and useful Improvements in Sanders for Vehicles, of which the following is a full, true, and exact specification.

My invention relates to sanders for vehicles and more particularly to sanders for use on automobiles, trucks and the like and has for its principal object to provide a device for spreading sand or the like in front of the traction wheels of a vehicle to prevent the wheels from slipping or skidding. A further object is to provide a control which is operable from the driver's seat of the vehicle. A further object is to provide a means for automatically screening out the larger particles from the sand as it is poured into the device.

Other objects will appear as my invention is more fully explained in the following specification, illustrated in the accompanying drawings and pointed out in the appended claim.

In the drawings, Figure 1 is a perspective view of my device shown in position to apply sand in front of an auto wheel. Fig. 2 is a side elevation of a preferred form of a sand receptacle which is adapted to have an air pressure feed.

Referring more particularly to the drawings, numeral 1 indicates a receptacle having a false or raised bottom 2 so as to form two sloping hoppers, one on either side of the receptacle 1. Receptacle 1 is provided with a screen or sieve 3 secured to a frame 4. The screen is held on to the top of receptacle 1 by lugs 5. Lugs 6 upstanding from receptacle 1 are adapted to be used to fasten the device to the frame or bottom of the chassis of an automobile or the like. All that is necessary in filling receptacle 1 is to pour the sand and gravel onto screen 3, which retains the larger particles until the receptacle is full. The screen and frame may be then removed and the larger particles dumped from it after which it may be replaced or another form of cover placed upon the receptacle. Valves 7, one on either side of receptacle 1 and communicating direct with the hoppers, are fitted with levers 8, a connecting rod 9 and a common link 10 which connects the rod 9 and a foot pedal 11 which is mounted in a convenient position near the driver's seat of a vehicle. Pipes 12 lead from valves 7 to points in line with and just in front of the rear or traction wheels 13 of the vehicle. The opening of the valve 7 by the driver allows the sand to flow by gravity upon the roadway just in front of the wheels, thus providing a good traction surface and preventing slipping or skidding of the wheels. The skidding of automobiles is very injurious to tires and dangerous to the safety of the occupants of the car. A preferred form of my device as shown in Fig. 2 comprises a receptacle 14 similar to receptacle 1 having either an air tight cover 15 and air connection 16 above the screen or an air connection 17 into pipe 12, the object in either case being to force the sand to flow by means of air pressure which is furnished from the usual compressor 22 on an automobile. In the first case the air is supplied to a closed receptacle above the sand and in the second to the distributing pipes 18 below the valve 19. The other features of the device are similar to those of Fig. 1.

While I have shown a particular form of embodiment of my invention, I am aware that many minor changes therein will readily suggest themselves to others skilled in the art without departing from the spirit and scope of the invention, and I therefore desire to avoid being limited to the exact form shown and described except as pointed out in the appended claim.

Having described my invention, what I claim as new and desire to protect by Letters Patent, is—

The combination with a motor driven vehicle having an air compressor of an air tight hoppered sand receptacle removably attachable to said vehicle and having pipes positioned to discharge the contents of the said receptacle in the path of the said wheels and having valves in the said pipes, a pipe joining the said compressor and the top of the said receptacle, whereby air under pressure is admitted above the surface of the sand in the receptacle for the purpose of forcing the sand from the said receptacle, independent sand valve controlling means between the said valves and the driver's cab of the vehicle, whereby the operation of opening the sand valves is independent of all other operations of the vehicle.

ARTHUR R. MORRISSEY.